(12) United States Patent  (10) Patent No.: US 12,210,233 B2
Pan et al.  (45) Date of Patent: Jan. 28, 2025

(54) ELECTRONIC DEVICE

(71) Applicant: InnoLux Corporation, Miao-Li County (TW)

(72) Inventors: I-Kai Pan, Miao-Li County (TW); Su-Chen Yen, Miao-Li County (TW); Ying-Chieh Tsai, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/421,339

(22) Filed: Jan. 24, 2024

(65) Prior Publication Data
US 2024/0184152 A1 Jun. 6, 2024

Related U.S. Application Data

(62) Division of application No. 17/338,326, filed on Jun. 3, 2021, now Pat. No. 11,927,840.

(30) Foreign Application Priority Data

Jul. 6, 2020 (CN) .......................... 202010639138.1

(51) Int. Cl.
G02F 1/13 (2006.01)
G02F 1/1335 (2006.01)
G02F 1/1339 (2006.01)

(52) U.S. Cl.
CPC ...... *G02F 1/1323* (2013.01); *G02F 1/133512* (2013.01); *G02F 1/13398* (2021.01)

(58) Field of Classification Search
CPC ............. G02F 1/1323; G02F 1/133512; G02F 1/13398; G02F 1/13471; G02F 1/13394; G02F 1/1333; G02F 1/133602–1/133614; G09F 9/30; G02B 6/0033–006
See application file for complete search history.

(56) References Cited

U.S. PATENT DOCUMENTS

| | | | |
|---|---|---|---|
| 5,530,567 A | 6/1996 | Takei | |
| 2005/0206814 A1 | 9/2005 | Histake | |
| 2015/0369972 A1 | 12/2015 | Asaoka et al. | |
| 2020/0276750 A1 | 9/2020 | Song et al. | |
| 2020/0387028 A1* | 12/2020 | Daishi | G02F 1/13394 |
| 2021/0041730 A1* | 2/2021 | Yue | G02F 1/1347 |
| 2022/0004035 A1 | 1/2022 | Pan et al. | |
| 2022/0260886 A1* | 8/2022 | Lee | G02F 1/13452 |
| 2022/0269128 A1 | 8/2022 | Matsushima | |

FOREIGN PATENT DOCUMENTS

| | | |
|---|---|---|
| CN | 101458411 A | 6/2009 |
| CN | 104880879 A | 9/2015 |
| CN | 110501824 A | 11/2019 |
| CN | 110737126 A | 1/2020 |
| CN | 110794628 A | 2/2020 |

* cited by examiner

Primary Examiner — Mariam Qureshi
(74) Attorney, Agent, or Firm — MUNCY, GEISSLER, OLDS & LOWE, P.C.

(57) ABSTRACT

An electronic device includes a display panel and a viewing angle control unit disposed opposite to the display panel. The viewing angle control unit includes a first substrate; a second substrate disposed opposite to the first substrate; and a plurality of protrusions disposed between the first substrate and the second substrate, wherein a transmittance of the plurality of protrusions is between about 0.006% and about 1.6%.

7 Claims, 6 Drawing Sheets

ELECTRONIC DEVICE

CROSS REFERENCE TO RELATED APPLICATION

This application is a division of U.S. patent application for U.S. application Ser. No. 17/338,326 filed Jun. 3, 2021, and the subject matter of which is incorporated herein by reference.

This application claims the benefits of the Chinese Patent Application Serial Number 202010639138.1, filed on Jul. 6, 2020, the subject matter of which is incorporated herein by reference.

BACKGROUND

1. Field of the Disclosure

The present disclosure relates to an electronic device and, more particularly, to an electronic device that can be controlled to have different brightness at different viewing angles.

2. Description of Related Art

As consumers pay more attention to personal privacy, an electronic product should be provided to make it difficult for people around to see the screen of the electronic product. However, in current electronic devices with a built-in viewing angle control unit, there is light leakage due to the arrangement of liquid crystal molecules being not ordered enough or other reasons, which may affect the quality of the electronic device.

In view of this, there is a need to develop an electronic device that can address the aforementioned problems so as to improve the brightness adjustment effect of the electronic device.

SUMMARY

The present disclosure provides an electronic device, which comprises: a display panel; and a viewing angle control unit disposed opposite to the display panel. The viewing angle control unit comprises: a first substrate; a second substrate disposed opposite to the first substrate; and a plurality of protrusions disposed between the first substrate and the second substrate, wherein a transmittance of the plurality of protrusions is between about 0.006% and about 1.6%.

Other novel features of the disclosure will become more apparent from the following detailed description when taken in conjunction with the accompanying drawings.

BRIEF DESCRIPTION OF THE DRAWINGS

FIG. 8 schematically illustrating a polar diagram of an electronic device having no shielding units and with the viewing angle function turned on;

FIG. 9 schematically illustrating a polar diagram of the electronic device of FIG. 1 with the viewing angle function turned on.

DETAILED DESCRIPTION OF EMBODIMENT

Figure 1:
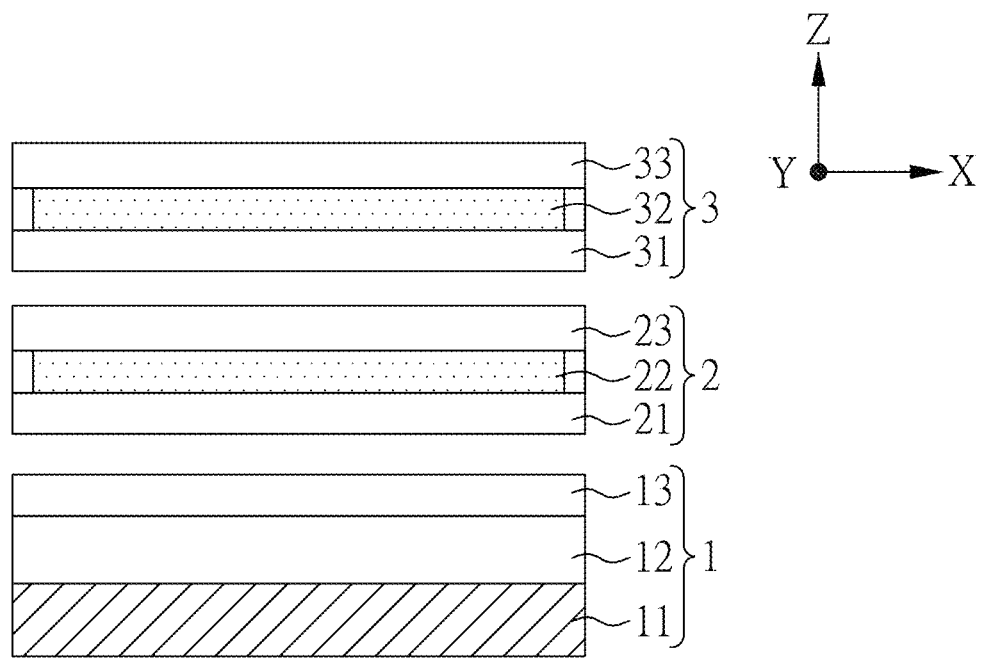
FIG. 1 is a schematic cross-sectional view of an electronic device according to an embodiment of the present disclosure.

The following provides different embodiments of the present disclosure. These embodiments are used to illustrate the technical content of the present disclosure, rather than to limit the claims of the present disclosure. A feature of one embodiment can be applied to other embodiments through suitable modification, substitution, combination, and separation.

It should be noted that, in the specification and claims, unless otherwise specified, having "one" element is not limited to having a single said element, but one or more said elements may be provided.

In addition, in the specification and claims, unless otherwise specified, ordinal numbers, such as "first" and "second", used herein are intended to distinguish components rather than disclose explicitly or implicitly that names of the components bear the wording of the ordinal numbers. The ordinal numbers do not imply what order a component and another component are in terms of space, time or steps of a manufacturing method. A "first" element and a "second" element may appear together in the same component, or separately in different components. The existence of an element with a larger ordinal number does not necessarily mean the existence of another element with a smaller ordinal number.

In the specification and claims, unless otherwise specified, the feature A "or" or "and/or" feature B means that feature A exists alone, feature B exists alone, or feature A and feature B exist at the same time. The feature A "and" or "with" or "plus" feature B refers to the simultaneous existence of feature A and feature B. The term "comprise", "include", "have" or "contain" refers to include but not limited to.

In addition, in the specification and claims, the term "upper", "lower" or "between" is only used to describe the relative positions of multiple elements, and can be extended to include translation, rotation, or mirroring in interpretation.

In addition, the positions mentioned in the specification and claims, such as "over", "on" or "above", may mean that the two elements are in direct contact, or may mean that the two elements are not in direct contact. Moreover, the positions mentioned in the specification and claims, such as "under" or "below", may mean that the two elements are in direct contact, or may mean that the two elements are not in direct contact.

In addition, the term "adjacent" in the specification and claims is used to describe mutual proximity, and does not necessarily mean mutual contact.

In addition, in the specification and claims, the term "about" usually means within 20%, 10%, 5%, 3%, 2%, 1% or 0.5% of a given value or range. The quantity of the given value is an approximate quantity, which means that the meaning of "about" may still be implied in the absence of a specific description of "about".

Unless otherwise defined, all terms (including technical and scientific terms) used herein have the same meaning as commonly understood by those skilled in the art related to the present disclosure. It can be understood that these terms, such as those defined in commonly used dictionaries, should be interpreted as having meaning consistent with the relevant technology and the background or context of the present disclosure, and should not be interpreted in an idealized or excessively formal way, unless there is a special definition in the embodiment of the present disclosure.

In addition, the electronic device disclosed in the present disclosure may include a display device, a touch display device, a curved display device or a free shape display device, but is not limited to this. The electronic device can be a bendable or flexible electronic device. The display layer of the display device may include, for example, liquid crystal, light emitting diode, quantum dot (QD), fluorescence, phosphor or other suitable display media, or a combination thereof, but is not limited to this. In the present disclosure, the light emitting diode may include, for example, OLED, LED, mini LED, micro LED, QD light emitting diode (for example, QLED, QDLED) or other suitable materials, or any combination thereof, but is not limited to this. The display device may include, for example, a tiled display device, but is not limited to this. It should be noted that the electronic device can be any combination of the foregoing, but is not limited to this. In addition, the appearance of the electronic device may be rectangular, circular, polygonal, a shape with curved edges, or other suitable shapes. The electronic device may be provided with a driving system, a control system, a light source system, a shelf system or other peripheral systems to support a display device or a tiled display device. Hereinafter, the display device will be used as an electronic device to illustrate the content of the present disclosure, but the present disclosure is not limited to this.

In the following embodiments of the present disclosure, the viewing angle control unit is defined as, when the viewing angle control unit function of the display device with the viewing angle control unit is turned on, the light intensity of the side viewing angle is reduced. More specifically, the viewing angle control unit may adjust the display device to have different brightness under the side viewing angle, so as to reduce the probability of other users seeing the display screen from the side viewing angle thereby achieving the effect of improving privacy. In addition, when the viewing angle control unit is turned off or on, the light intensity of the side viewing angle of the display device with the viewing angle control unit is different, and thus the so-called off/on ratio refers to a ratio of the light intensity when the viewing angle control unit function is turned off to the light intensity when the viewing angle control unit function is turned on. Under a configured angle, the higher the off/on ratio, the better the function of enhancing privacy, that is, the light intensity observed at the side viewing angle is controlled to be relatively low, in which the light intensity refers to that of the electronic device. For the convenience of description, the light intensity in the present disclosure is taken, for example, with a side viewing angle of 45 degrees, but the present disclosure is not limited to this.

FIG. 1 is a schematic cross-sectional view of an electronic device according to an embodiment of the present disclosure. The electronic device of this embodiment is a display device with a viewing angle control unit, which includes: a display panel 2; and a viewing angle control unit 3 disposed opposite to the display panel 2. In this embodiment, the viewing angle control unit 3 is disposed above the display panel 2. However, the present disclosure is not limited to this. In other embodiments of the present disclosure, the viewing angle control unit 3 may be disposed under the display panel 2, as shown in FIG. 2.

Figure 2:
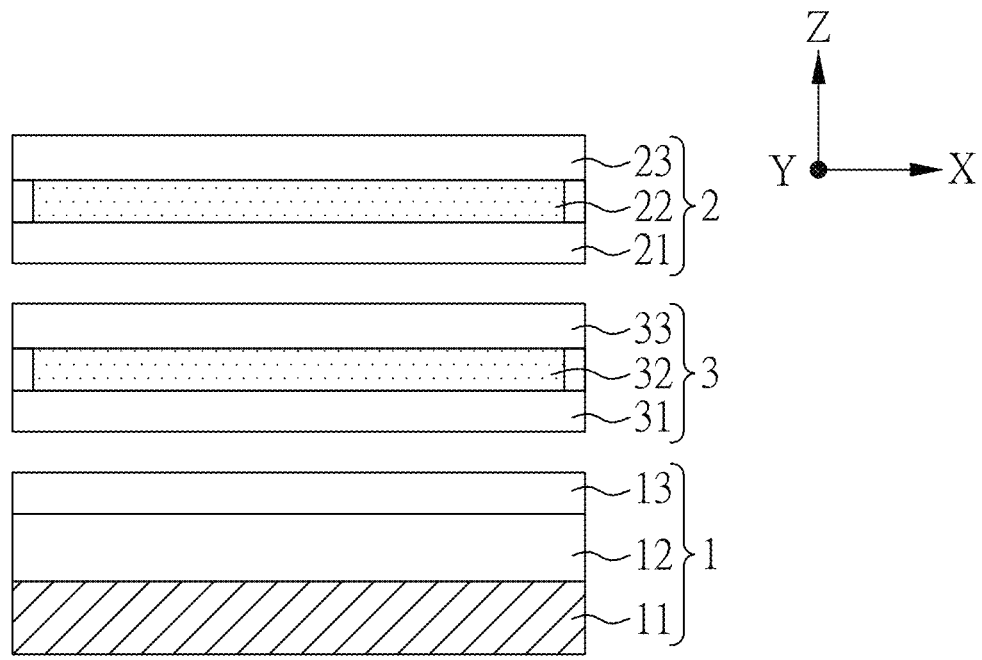
FIG. 2 is a schematic cross-sectional view of an electronic device according to another embodiment of the disclosure.

As shown in FIG. 1 or FIG. 2, the viewing angle control unit 3 includes: a first substrate 31; and a second substrate 33 disposed opposite to the first substrate 31. In addition, the viewing angle control unit 3 further includes a liquid crystal layer 32 disposed between the first substrate 31 and the second substrate 33. In the present disclosure, the liquid crystal layer 32 may include: hybrid aligned nematic (HAN) liquid crystal molecule, electrically controlled birefringence (ECB) liquid crystal molecule, vertically aligned nematic (VAN) liquid crystal molecule or other liquid crystal molecules. However, the present disclosure is not limited to this. In addition, although not shown in the figure, in this embodiment, polarizing plates may be further provided respectively on both sides of the viewing angle control unit 3, that is, below the first substrate 31 and above the second substrate 33.

As shown in FIG. 1 or FIG. 2, the display panel 2 includes: a third substrate 21; a fourth substrate 23 disposed opposite to the third substrate 21; and a display layer 22 disposed between the third substrate 21 and the fourth substrate 23. The display medium included in the display layer 22 is similar to that as described above, and will not be repeated again, and the display medium being a liquid crystal is taken as an example to illustrate the content of the present disclosure, but the present disclosure is not limited to this.

In one embodiment of the present disclosure, the third substrate 21 is a thin film transistor substrate, on which at least one thin film transistor is disposed, depending on the design requirement, and the fourth substrate 23 is a color filter, on which a color filter layer and a black matrix layer are disposed. In another embodiment of the present disclosure, the third substrate 21 is a color filter on array (COA) substrate, which is thin film transistor substrate integrated with a color filter array. In yet another embodiment of the disclosure, the third substrate 21 is a black matrix on array (BM on array, BOA) substrate. In addition, although not shown in the figure, in this embodiment, polarizing plates may be further provided respectively on both sides of the display panel 2, that is, below the third substrate 21 and above the fourth substrate 23. More specifically, when the viewing angle control unit 3 is disposed above the display panel 2, at least one polarizing plate may be disposed between the viewing angle control unit 3 and the display panel 2 according to the requirement, but the present disclosure is not limited to this. Furthermore, although not shown in the figure, the display panel 2 in this embodiment may further include an alignment layer, sealant or other elements.

In the present disclosure, the first substrate 31, the second substrate 33, the third substrate 21 and the fourth substrate 23 include flexible substrates or non-flexible substrates, and the materials thereof include, for example, glass, quartz, wafer, sapphire, polycarbonate (PC), polyimide (PI), polypropylene (PP), polyethylene terephthalate (PET), other suitable materials or a combination of the aforementioned materials. The materials of the first substrate 31, the second substrate 33, the third substrate 21 and the fourth substrate 23 can be arbitrarily selected according to the design requirement, such that the material of at least one substrate is different from those of other substrates.

As shown in FIG. 1 or FIG. 2, the display panel 2 is a liquid crystal display panel, and thus the electronic device of this embodiment may further include: a backlight module 1, wherein the display panel 2 and the viewing angle control unit 3 are disposed on the backlight module 1. More specifically, the display panel 2 and the viewing angle control unit 3 are disposed on the light-emitting surface of the backlight module 1. However, the present disclosure is not limited to this. In other embodiments of the present disclosure, when the display panel 2 is a self-illuminating display panel, such as a display panel using light-emitting diodes or quantum dots as the display medium, the electronic device does not need to be provided with the backlight module 1 as shown in FIG. 1 or FIG. 2.

As shown in FIG. 1 or FIG. 2, the backlight module 1 includes: a reflective sheet 11; a light guide plate 12 disposed on the reflective sheet 11; and a membrane 13 disposed on the light guide plate 12. The membrane 13 includes, for example, a brightness enhancement film, a diffusion sheet or other films. Furthermore, although not shown in the figure, the backlight module 1 may further include a light source. In FIG. 1 or FIG. 2, the backlight module 1 is a side-light backlight module. However, the present disclosure is not limited to this. In other embodiments of the present disclosure, the backlight module 1 may be a direct-type backlight module.

In addition, although not shown in the figure, in the electronic device of FIG. 1 or FIG. 2, the display panel 2 and the viewing angle control unit 3 may be driven by two ICs, respectively.

In the electronic device of FIG. 1, the viewing angle control unit 3 is disposed above the display panel 2. In this way, when the display panel 2 is a liquid crystal display panel, it can reduce leakage of light scattered by the liquid crystal of the display panel 2, thereby improving the off/on ratio of the electronic device.

Figure 3:
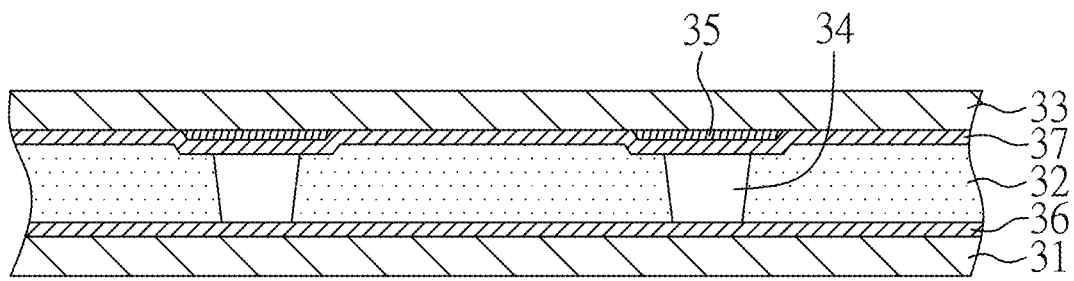
FIG. 3 is a schematic partial cross-sectional view of a viewing angle control unit according to an embodiment of the present disclosure.

FIG. 3 is a schematic partial cross-sectional view of a viewing angle control unit according to an embodiment of the present disclosure. The viewing angle control unit includes: a first substrate 31; a second substrate 33 disposed opposite to the first substrate 31; a plurality of protrusions 34 disposed between the first substrate 31 and the second substrate 33; and a plurality of shielding units 35 disposed between the first substrate 31 and the second substrate 33 and disposed corresponding to the plurality of protrusions 34, wherein the plurality of protrusions 34 may be rectangular, circular, or trapezoidal, respectively, but the present disclosure is not limited to this. The plurality of shielding units 35 may be a patterned black matrix layer, wherein the black matrix layer may be rectangular, circular, regular trapezoid or inverted trapezoid, but the present disclosure is not limited to this.

In addition, the optical density (OD) of the plurality of protrusions 34 may be between about 1.8 and about 4.2 ($1.8 \leq OD \leq 4.2$). In another embodiment of the present disclosure, the transmittance (T %) of the plurality of protrusions 34 may be between about 0.006% and about 1.6% ($0.006\% \leq T\% \leq 1.6\%$). In still another embodiment of the present disclosure, the plurality of protrusions 34 are each a black spacer, which may include a black photoresist. If the plurality of protrusions 34 of the viewing angle control unit are transparent spacers, the light passing through the transparent spacers will be scattered to cause light leakage, and the scattered light is light with a large angle (for example, 45 degrees), which will affect the capability of the viewing angle control unit in adjusting the display brightness, resulting in lowering the off/on ratio of the electronic device. In the present disclosure, when the viewing angle control unit includes the plurality of protrusions 34 having the aforementioned optical density range, the light passing through the plurality of protrusions 34 will be absorbed, and thus no large-angle light will be scattered by the plurality of protrusions 34, whereby light leakage may be blocked to improve the off/on ratio of the electronic device.

As shown in FIG. 3, a first electrode layer 36 is further provided on the first substrate 31, and a second electrode layer 37 is further provided on the second substrate 33, wherein the liquid crystal layer 32 is disposed between the first electrode layer 36 and the second electrode layer 37. By using the first electrode layer 36 and the second electrode layer 37 to control the orientation of the liquid crystal molecules in the liquid crystal layer 32, the viewing angle control unit function can be controlled to be on or off. In addition, in FIG. 3, the first electrode layer 36 and the second electrode layer 37 are a full-surface electrode; but the present disclosure is not limited to this. In other embodiments of the present disclosure, the first electrode layer 36 or the second electrode layer 37 may be a patterned electrode. The first electrode layer 36 or the second electrode layer 37 may include a transparent metal oxide, for example, indium tin oxide (ITO), indium zinc oxide (IZO), indium tin zinc oxide (ITZO), indium gallium zinc oxide (IGZO) or aluminum zinc oxide (AZO); but the present disclosure is not limited to this.

In the viewing angle control unit shown in FIG. 3, the first electrode layer 36 is formed on the first substrate 31; then, the plurality of shielding units 35, the second electrode layer 37 and the plurality of protrusions 34 are formed on the second substrate 33; and the first substrate 31 and the second substrate 33 are oppositely combined together, wherein the plurality of shielding units 35 and the plurality of protrusions 34 are correspondingly arranged to obtain the viewing angle control unit of this embodiment.

Figure 4:
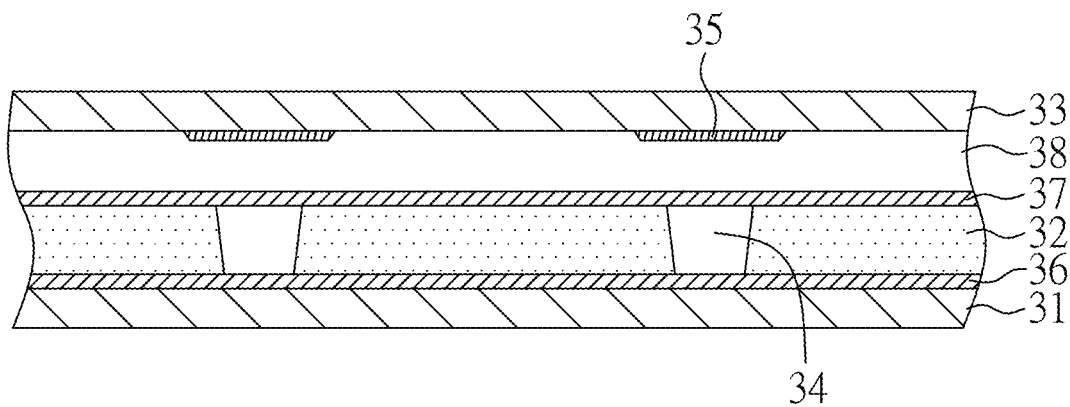
FIG. 4 is a schematic partial cross-sectional view of a viewing angle control unit according to another embodiment of the present disclosure.

FIG. 4 is a schematic partial cross-sectional view of a viewing angle control unit according to another embodiment of the present disclosure, which is similar to FIG. 3 except that a protection layer 38 is further provided between the plurality of shielding units 35 and the second electrode layer 37. The protection layer 38 may be provided to block moisture so as to prevent elements from deterioration due to moisture.

Figure 5:
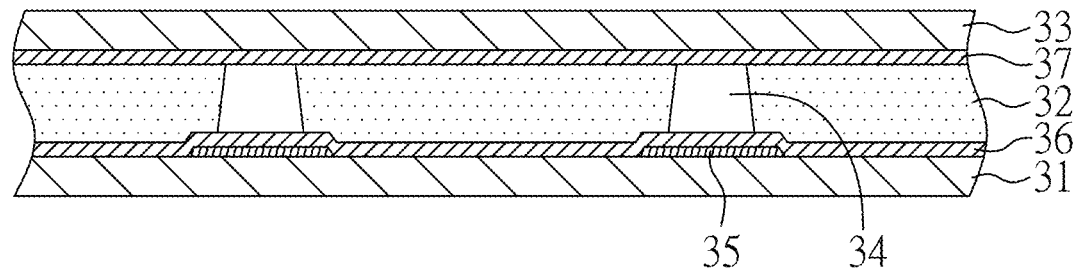
FIG. 5 is a schematic partial cross-sectional view of a viewing angle control unit according to still another embodiment of the present disclosure.

FIG. 5 is a schematic partial cross-sectional view of a viewing angle control unit according to still another embodiment of the present disclosure, which is similar to FIG. 3 except that the plurality of shielding units 35 and the first electrode layer 36 are sequentially formed on the first substrate 31; then the second electrode layer 37 and the plurality of protrusions 34 are sequentially formed on the second substrate 33; and the first substrate 31 and the second substrate 33 are oppositely combined together, wherein the plurality of shielding units 35 and the plurality of protrusions 34 are correspondingly arranged to obtain the viewing angle control unit of this embodiment.

In addition, although not shown in FIG. 3 to FIG. 5, the viewing angle control unit of the present disclosure may further include an alignment layer, sealant or other elements.

Figure 6:
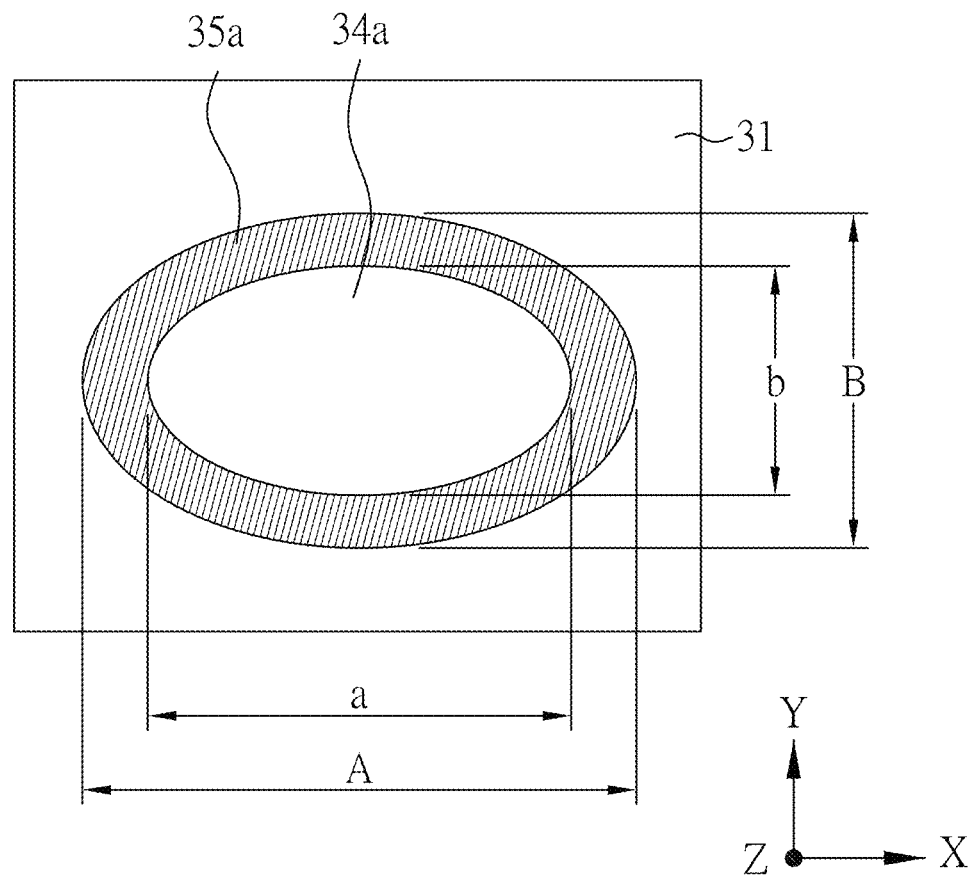
FIG. 6 is a schematic diagram illustrating the projections of the protrusion and the shielding unit of the viewing angle control unit on the first substrate according to an embodiment of the disclosure.

In any of the viewing angle control units shown in FIG. 3 to FIG. 5, the projection of one of the plurality of shielding units 35 and one of the plurality of protrusions 34 on the first substrate 31 is shown in FIG. 6.

As shown in FIG. 6, one of the plurality of shielding units 35 forms a first projection 35a on the first substrate 31, and one of the plurality of protrusions 34 forms a second projection 34a on the first substrate 31, wherein the second projection 34a falls within the first projection 35a.

As shown in FIG. 3 to FIG. 6, if the viewing angle control unit is not equipped with the plurality of shielding units 35, the scattered light caused by the misalignment of the liquid crystals near the protrusions 34 will result in light leakage, which will thus decrease the off/on ratio of the electronic device. In the present disclosure, when the viewing angle control unit includes a plurality of shielding units 35, the plurality of shielding units 35 may block light leakage and thus improve the off/on ratio of the electronic device.

As shown in FIG. 6, the first projection 35a has a first maximum length "A" in a first direction X, the second projection 34a has a second maximum length "a" in the first direction X. The first maximum length "a" and the second maximum length "A" satisfy the following formula (I):

$$2 \geq A/a \geq 1, \quad (I)$$

where A is the first maximum length, and a is the second maximum length.

In addition, the first projection 35a has a first maximum width "B" in a second direction Y, and the second projection 34a has a second maximum width "b" in the second direction Y, wherein the first direction X is different from the second direction Y. The first maximum width "B" and the second maximum width "b" satisfy the following formula (II):

$$2 \geq B/b \geq 1, \quad (II)$$

where B is the first maximum width, and b is the second maximum width.

In another embodiment of the present disclosure, the first maximum length "A" and the second maximum length "a" satisfy the following formula (I'):

$$2 \geq A/a > 1. \quad (I')$$

In another embodiment of the present disclosure, the first maximum width "B" and the second maximum width "b" satisfy the following formula (II'):

$$2 \geq B/b > 1. \quad (II')$$

When A/a or B/b is smaller than 1, the second projection 34a does not completely fall within the first projection 35a, and thus there is a problem of poor light leakage shielding. When A/a or B/b is greater than 2, the area of the shielding unit 35 is too large, which will affect the light transmittance of the electronic device. In consideration of the angle and path of the scattered light caused by the misalignment of liquid crystals, when the first projection 35a and the second projection 34a satisfy the formula (I) and/or the formula (II), it is able to effectively block the light leakage resulted from light scattered by misalignment of liquid crystals caused by the plurality of protrusions 34 (as shown in FIG. 3 to FIG. 5), thereby increasing the off/on ratio of the electronic device.

In FIG. 6, the first direction X and the second direction Y are substantially perpendicular to each other. In one embodiment of the present disclosure, the included angle between the first direction X and the second direction Y is approximately between 75 degrees and 105 degrees. In another embodiment of the present disclosure, the included angle between the first direction X and the second direction Y is approximately between 80 degrees and 100 degrees. In still another embodiment of the present disclosure, the included angle between the first direction X and the second direction Y is approximately between 85 degrees and 95 degrees.

Figure 7:
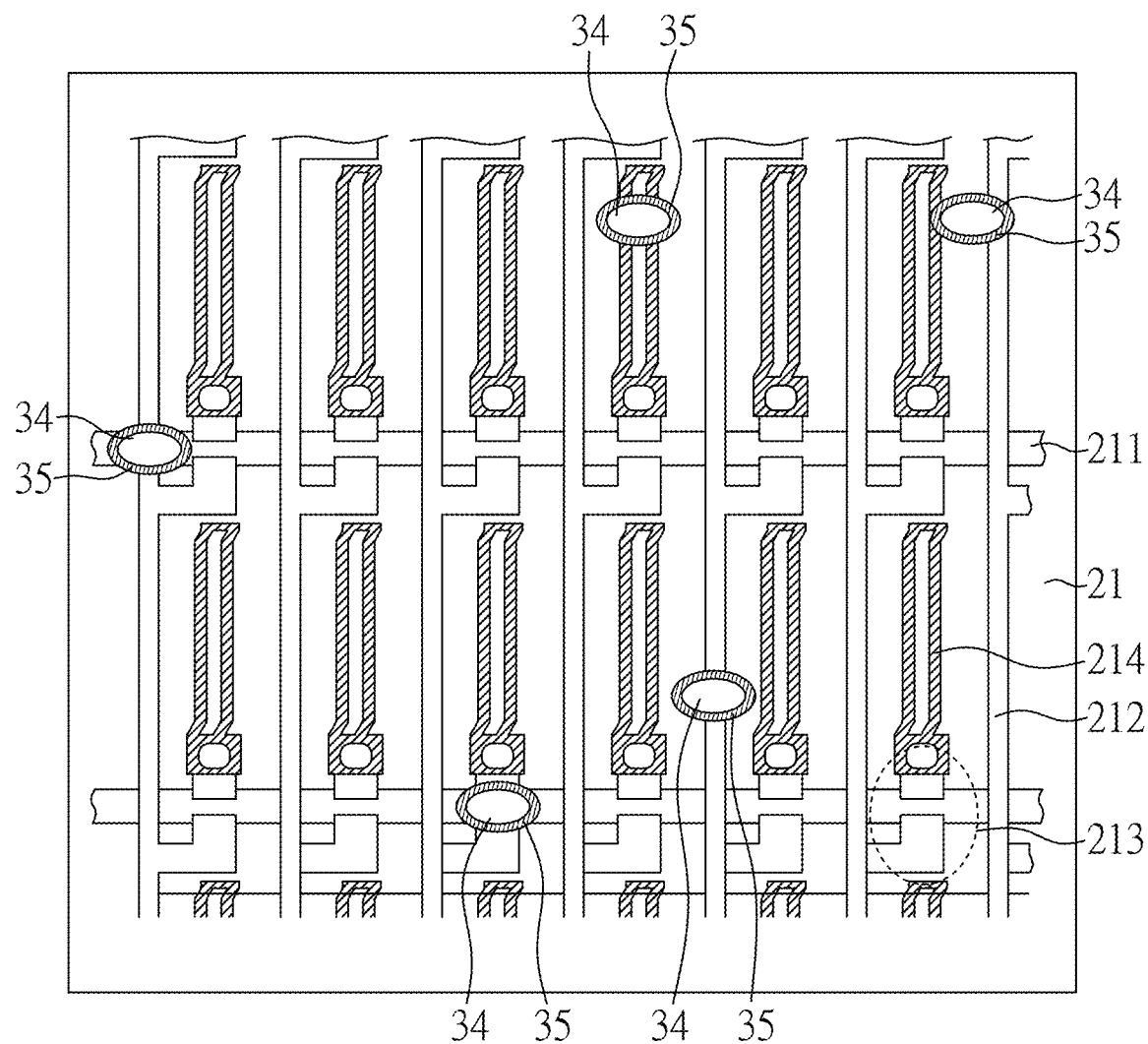
FIG. 7 is a top view of the protrusions and shielding units of the viewing angle control unit, and the conductive lines of the display panel according to an embodiment of the present disclosure.

FIG. 7 is a top view of the protrusions and shielding units of the viewing angle control unit, and the conductive lines of the display panel according to an embodiment of the disclosure.

As shown in FIG. 1 or FIG. 2, the display panel 2 includes a third substrate 21. As shown in FIG. 7, the third substrate 21 is provided with a plurality of conductive lines including a plurality of scan lines 211 and a plurality of data lines 212. In addition, the third substrate 21 is further provided with a plurality of transistors 213 which are electrically connected to the plurality of scan lines 211 and the plurality of data lines 212. Furthermore, the third substrate 21 is further provided with pixel electrodes 214 which are electrically connected to the plurality of thin film transistors 213. FIG. 7 is a schematic diagram of a thin film transistor substrate of a display panel according to an embodiment of the disclosure. However, the present disclosure is not limited to this. In other embodiments of the present disclosure, the structure, shape, and arrangement of the elements on the transistor substrate of the display panel may be adjusted as required.

As shown in FIG. 7, in the normal direction of the first substrate 31 (which is substantially equal to the normal direction Z of the third substrate 21 shown in FIG. 1 or FIG. 2), one of the plurality of shielding units 35 overlaps with one of the plurality of conductive lines (including the plurality of scan lines 211 and the plurality of data lines 212). In more detail, part of the plurality of shielding units 35 may overlap with part of the plurality of scan lines 211, and part of the plurality of shielding units 35 may not overlap with part of the plurality of scan lines 211. Alternatively, part of the plurality of shielding units 35 may overlap with part of the plurality of data lines 212, and part of the plurality of shielding units 35 may not overlap with part of the plurality of data lines 212.

In addition, as shown in FIG. 7, the plurality of protrusions 34 are arranged irregularly, wherein the arrangement of the plurality of protrusions 34 may be calculated through aerodynamic method, but the present disclosure is not limited to this.

In the present disclosure, when the plurality of protrusions 34 are arranged irregularly, there is a distance between any two adjacent protrusions in the plurality of protrusions 34 and, in the viewing angle control unit, there are at least four different distances, wherein two adjacent protrusions means that there are no other protrusions between them. However, the present disclosure is not limited to this. In addition, said distance between any two adjacent protrusions in the plurality of protrusions 34 refers to the distance between the center points of any two adjacent protrusions in the plurality of protrusions 34.

When the plurality of protrusions 34 of the viewing angle control unit are arranged irregularly, it is able to improve the moiré phenomenon that may occur when the electronic device is in the bright state.

Figure 8:
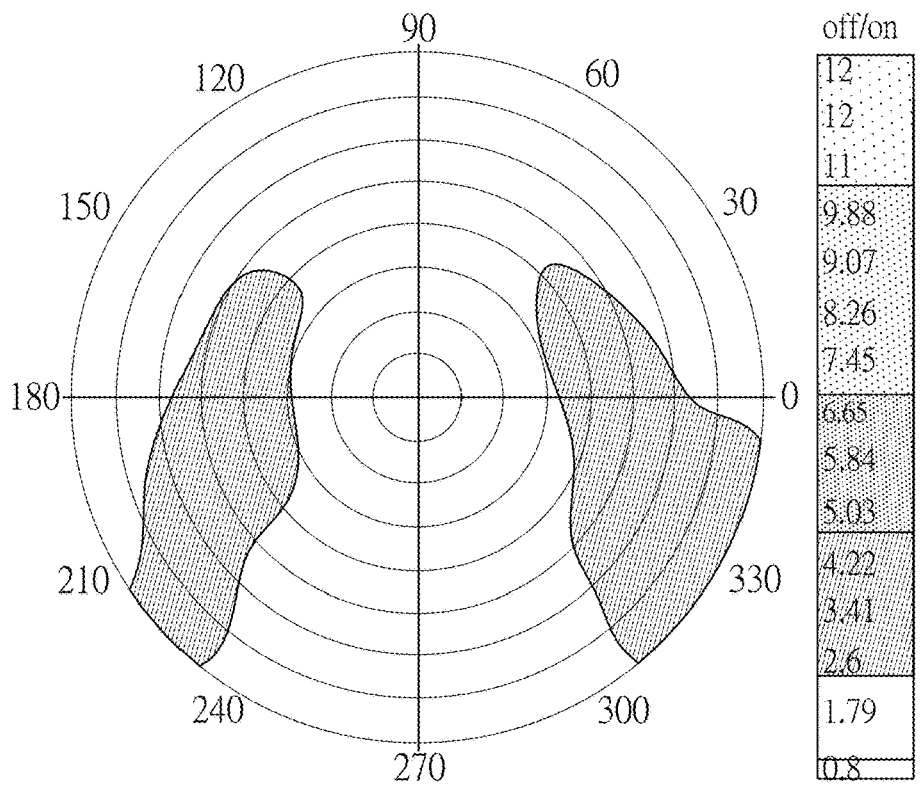
Figure 9:
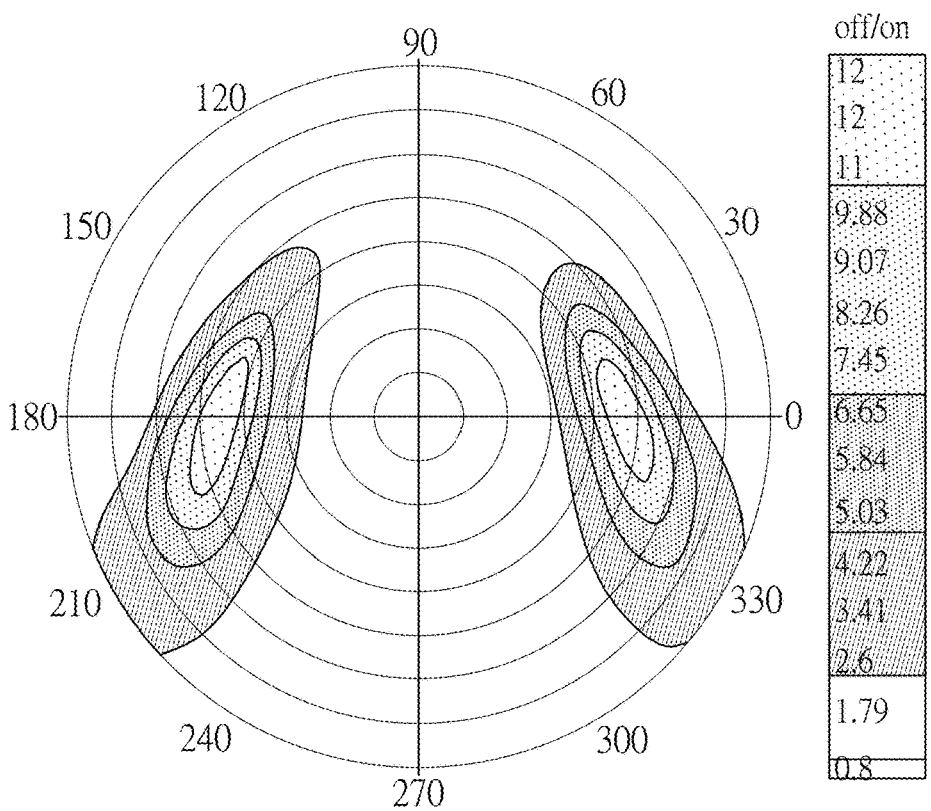

FIG. 8 schematically illustrating a polar diagram of an electronic device having no shielding units and with the viewing angle function turned on. FIG. 9 schematically illustrating a polar diagram of the electronic device of FIG. 1 with the viewing angle function turned on. The structure of the viewing angle control unit 3 may be as shown in FIG. 3.

The difference between the electronic devices that generate the polar diagrams shown in FIGS. 8 and 9 is that the electronic device of FIG. 8 is not provided with a plurality of shielding units, that is, not provided with the plurality of shielding units 35 corresponding to the plurality of protrusions 34 as shown in FIG. 3. The polar diagram is obtained by taking the plane of the electronic device as the XY direction (as shown in FIG. 1), and viewing from the Z axis to the XY plane obliquely, so that the range of θ (polarization angle) is −90 to +90 degrees. When projecting to a 2D image, the periphery of the 2D image refers to the azimuth angle.

As shown in FIGS. 8 and 9, the off/on ratio of the side viewing angle of an electronic device without a plurality of shielding units is obviously lower than that of an electronic device provided with a plurality of shielding units.

Figure 10:
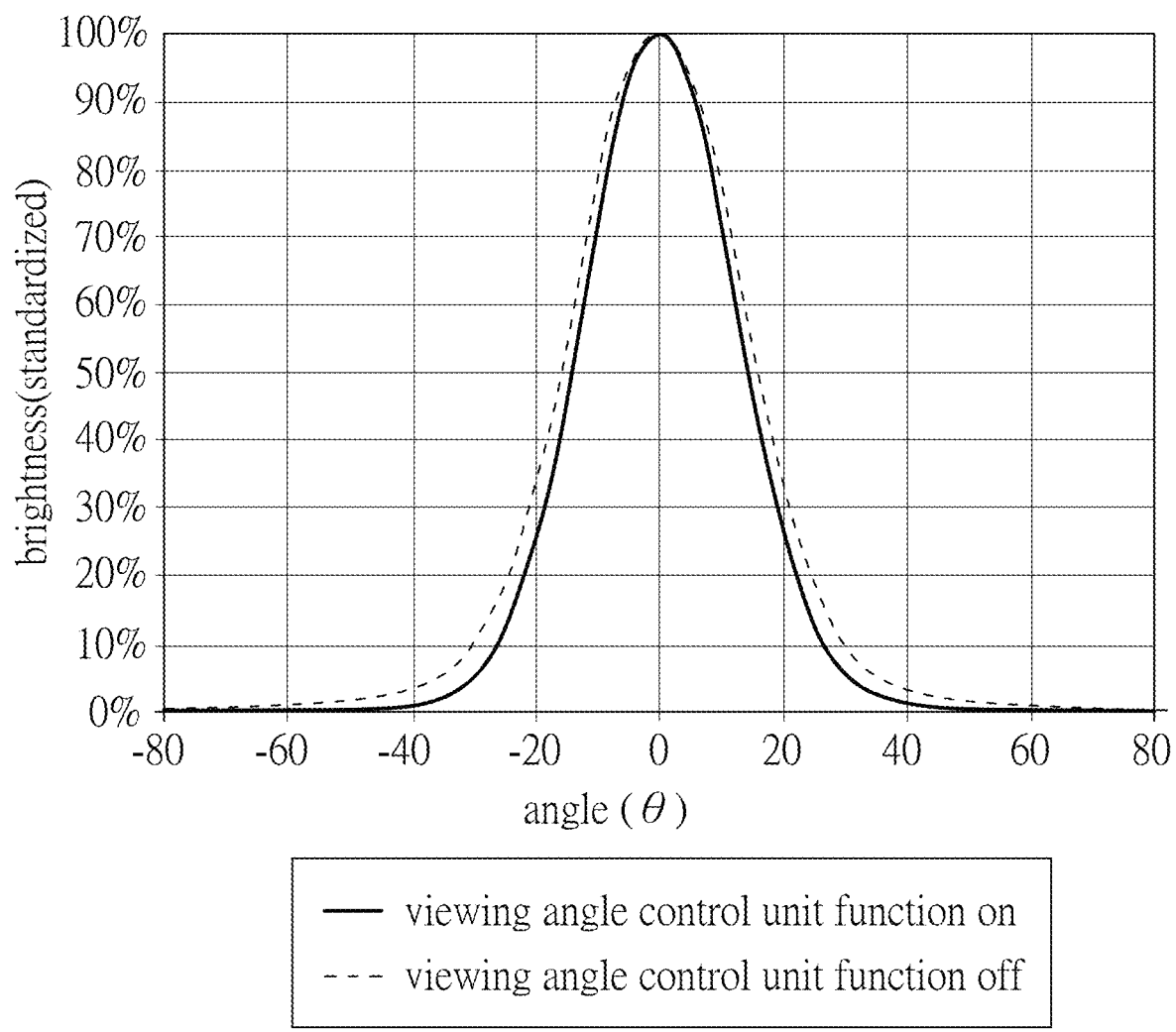
FIG. 10 is a schematic diagram of the light patterns of an electronic device with the viewing angle control unit function turned on and off.

FIG. 10 is a schematic diagram of the light patterns of an electronic device of FIG. 1 with the viewing angle control unit function turned on and off, wherein the structure of the viewing angle control unit 3 may be as shown in FIG. 3. As shown in FIG. 10, the light pattern when the viewing angle control unit function is turned on is wider than the light pattern when the viewing angle control unit function is turned off, such as the light pattern from a side viewing angle of −45 degrees to a side viewing angle of 45 degrees, but the present disclosure is not limited to this. Furthermore, as shown in FIG. 10, when the side viewing angle is about 45 degrees, in comparison with the viewing angle control unit function being turned off, the brightness of the electronic device with the viewing angle control unit function turned on is lower, which indicates that the electronic device surely enhances the effect of the user privacy. In this illustration, the viewing angle control unit of the electronic device is designed with a side viewing angle of about 45 degrees as an example, but the present disclosure is not limited to this. In other embodiments of the present disclosure, the viewing angle control unit of the electronic device may have a side viewing angle of about 30, 50, 60 or 75 degrees, depending on the design requirement.

In the present disclosure, through the design of the viewing angle control unit, the brightness of the side viewing angle of the electronic device can be changed as required. In addition, through the design of the protrusions and/or the shielding units in the viewing angle control unit, the light leakage may be further improved, and thus the off/on ratio of the side viewing angle of the electronic device may be increased. Furthermore, when the viewing angle control unit is provided on the display panel, the off/on ratio of the electronic device may be further increased. In comparison with an electronic device without a viewing angle control unit, the electronic device of the present disclosure may increase the off/on ratio, thereby enhancing the privacy effect for the user using the electronic device.

In the present disclosure, as long as the features of the embodiments do not violate the spirit of disclosure or conflict with each other, they can be mixed and matched arbitrarily.

Although the present disclosure has been explained through a number of embodiments, it is to be understood that many other possible modifications and variations can be made without departing from the spirit and scope of the disclosure as hereinafter claimed.

The aforementioned specific embodiments should be construed as merely illustrative, and not limiting the rest of the present disclosure in any way.

What is claimed is:

1. An electronic device, comprising:
   a display panel; and
   a viewing angle control unit disposed opposite to the display panel, wherein the viewing angle control unit comprises:
   a first substrate;
   a second substrate disposed opposite to the first substrate;
   a plurality of protrusions disposed between the first substrate and the second substrate, wherein a transmittance of the plurality of protrusions is between about 0.006% and about 1.6%; and
   a plurality of shielding units disposed between the first substrate and the second substrate and disposed corresponding to the plurality of protrusions, wherein one of the plurality of shielding units forms a first projection on the first substrate, one of the plurality of protrusions forms a second projection on the first substrate, and the second projection falls within the first projection,
   wherein the first projection has a first maximum length in a first direction, the second projection has a second maximum length in the first direction, the first maximum length and the second maximum length satisfy the following formula (I), the first projection has a first maximum width in a second direction, the second projection has a second maximum width in the second direction, the first direction is different from the second direction, and the first maximum width and the second maximum width satisfy the following formula (II):

$$2 \geq A/a \geq 1, \tag{I}$$

$$2 \geq B/b \geq 1, \tag{II}$$

where A represents the first maximum length, a represents the second maximum length, B represents the first maximum width, and b represents the second maximum width.

2. The electronic device of claim 1, wherein the display panel comprises a plurality of conductive lines, and one of the plurality of shielding units overlaps with one of the plurality of conductive lines in a normal direction of the first substrate.

3. The electronic device of claim 1, wherein the first direction and the second direction are substantially perpendicular to each other.

4. The electronic device of claim 1, wherein the plurality of protrusions are arranged irregularly.

5. The electronic device of claim 1, wherein an optical density of the plurality of protrusions is between 1.8 and 4.2.

6. The electronic device of claim 1, wherein each of the plurality of protrusions is a black spacer, and the black spacer includes a black photoresist.

7. The electronic device of claim 1, wherein the viewing angle control unit further comprises a liquid crystal layer disposed between the first substrate and the second substrate.

* * * * *